United States Patent
Chu et al.

(10) Patent No.: US 9,830,384 B2
(45) Date of Patent: *Nov. 28, 2017

(54) FOREIGN ORGANIZATION NAME MATCHING

(71) Applicant: INTERNATIONAL BUSINESS MACHINES CORPORATION, Armonk, NY (US)

(72) Inventors: Stephen M. Chu, Beabercreek, OH (US); Ning Duan, Beijing (CN); Min Gong, Shanghai (CN); Junchi Yan, Shanghai (CN); Xuan Zhang, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/926,200

(22) Filed: Oct. 29, 2015

(65) Prior Publication Data

US 2017/0124185 A1    May 4, 2017

(51) Int. Cl.
G06F 17/30    (2006.01)
G06F 17/28    (2006.01)

(52) U.S. Cl.
CPC ...... *G06F 17/30699* (2013.01); *G06F 17/289* (2013.01); *G06F 17/30669* (2013.01); *G06F 17/30684* (2013.01); *G06F 17/30867* (2013.01)

(58) Field of Classification Search
CPC ................................................ G06F 17/30669
See application file for complete search history.

(56) References Cited

U.S. PATENT DOCUMENTS 8,566,710 B2    10/2013  Travieso et al.
8,577,910 B1 *  11/2013  Hodge ................... G06F 17/30
                                              706/11

(Continued)

FOREIGN PATENT DOCUMENTS

CN    101661480 A       3/2010
CN    101676898 A       3/2010
WO    WO2009120449 A1   10/2009

OTHER PUBLICATIONS

Ren et al., "A Novel Chinese-English ON Translation Method Using Mix-language Web Pages", 2010 IEEE; 8 pgs.

(Continued)

*Primary Examiner* — Mohammad S Rostami
(74) *Attorney, Agent, or Firm* — Cantor Colburn LLP

(57) ABSTRACT

Embodiments include a system, method, and computer program product for foreign organization name matching. Aspects include receiving a first entity name from a first database configured in a first language and receiving a second database, wherein the second database includes a plurality of entity names in a second language, wherein the first and second languages are different. Aspects also include performing an Internet search based on the first entity name, wherein a language setting of the Internet search is configured to the second language and identifying a list of candidate names based on a set of results from the Internet search. Another aspect includes filtering the list to obtain a resulting candidate name and determining whether the resulting candidate name matches one of the entity names in the second database. Aspects include associating the first entity name and a matching entity name in the second database based on the determination.

11 Claims, 4 Drawing Sheets

Processing System – 100

(56) References Cited

U.S. PATENT DOCUMENTS

| | | | |
|---|---|---|---|
| 2004/0122656 A1* | 6/2004 | Abir | G06F 17/2872 704/4 |
| 2004/0204942 A1* | 10/2004 | Lee | G10L 15/005 704/254 |
| 2008/0235202 A1* | 9/2008 | Wang | G06F 17/30669 |
| 2009/0083243 A1* | 3/2009 | Heymans | G06F 17/30669 |
| 2010/0153396 A1* | 6/2010 | Margulies | G06F 17/2863 707/737 |
| 2012/0290555 A1* | 11/2012 | Wu | G06F 17/30566 707/707 |
| 2012/0330989 A1* | 12/2012 | Tan | G06F 17/289 707/760 |
| 2013/0060748 A1* | 3/2013 | Bennett | G06F 9/4448 707/709 |
| 2013/0185276 A1* | 7/2013 | Rau | G06F 17/30864 707/707 |
| 2014/0330865 A1* | 11/2014 | Xue | G06F 17/30241 707/769 |
| 2015/0161260 A1* | 6/2015 | Balani | G06F 17/3053 707/723 |
| 2015/0370784 A1* | 12/2015 | Nissan | G06F 17/2809 704/2 |

OTHER PUBLICATIONS

Yang et al., "A Chinese-English Organization Name Translation System Using Heuristic Web Mining and Asymmetric Alignment", Aug. 2-7, 2009; Proceedings of the 47th Annual Meeting of the ACL and 4th IJCNLP of the AFNLP, pp. 387-395.

List of IBM Patents or Patent Applictions Treated as Related; (Appendix P), Filed Feb. 2, 2016, 2 pages.

Stephen M. Chu, et al., Pending U.S. Appl. No. 14/969,345 entitled "Foreign Organization Name Matching;" filed with the U.S. Patent and Trademark Office on Dec. 15, 2015.

Chu, Stephen M. et al., Pending U.S. Appl. No. 15/131,281 entitled "Foreign Organization Name Matching," filed with the U.S. Patent and Trademark Office on Apr. 18, 2016.

Chu, Stephen M. et al., Pending U.S. Appl. No. 15/460,435 entitled "Foreign Organization Name Matching," filed with the U.S. Patent and Trademark Office on Mar. 16, 2017.

List of IBM Patents or Patent Applictions Treated as Related; (Appendix P), Filed Apr. 24, 2017, 2 pages.

* cited by examiner

FOREIGN ORGANIZATION NAME MATCHING

BACKGROUND

The present disclosure relates generally to determining data matches between disparate databases using online search tools, and more specifically, to foreign organization name matching.

In today's environment, companies conduct business globally and have a need to manage their international accounts and customers. In order to do so, they must have the capability to quickly and efficiently identify these international accounts using existing tools. Typically, large organizations have multiple customer and supplier databases that contain information regarding companies that they work with. In multi-national organizations, it is common for separate databases to be maintained for various portions of the company that operate in different countries, such databases are normally provided in the native language for each country.

Multi-national companies face many challenges when trying to identify international companies and accounts. Currently, searching across the company for data relating to a particular customer or supplier requires performing multiple searches of the various databases that are maintained in multiple languages. In addition, when searching a customer database for a foreign company name the search results may yield irrelevant search hits because a company may be known by another name in a foreign country. Also companies may not have personnel to perform database searches in each and every foreign language to locate the name of the desired foreign company.

SUMMARY

In accordance with an embodiment of the invention, a method for foreign name matching is provided. The method includes receiving a first entity name from a first database, wherein the first database includes a plurality of entity names in a first language, and receiving a second database, wherein the second database includes a plurality of entity names in a second language, wherein the first language is different from the second language. The method also includes performing an Internet search query based on the first entity name, wherein a language setting of the Internet search query is configured to the second language, and identifying a list of candidate names based on a set of results from the Internet search query. The method includes filtering the list of candidate names to obtain a resulting candidate name, and determining whether the resulting candidate name matches one of the plurality of entity names in the second database. Based on the determining whether the resulting candidate name matches one of the plurality of entity names in the second database, the method includes creating an association between the first entity name in the first database and a matching entity name in the second database.

In accordance with another embodiment of the invention, processor system for foreign name matching is provided includes a processor in communication with a memory. The processor is configured to receive a first entity name from a first database, wherein the first database includes a plurality of entity names in a first language, and receive a second database, wherein the second database includes a plurality of entity names in a second language, wherein the first language is different from the second language. The processor is further configured to perform an Internet search query based on the first entity name, wherein a language setting of the Internet search query is configured to the second language, and identify a list of candidate names based on a set of results from the Internet search query. The processor is further configured to filter the list of candidate names to obtain a resulting candidate name and determine whether the resulting candidate name matches one of the plurality of entity names in the second database. Based on the determination of whether the resulting candidate name matches one of the plurality of entity names in the second database, the processor is configured to create an association between the first entity name in the first database and a matching entity name in the second database.

In accordance with a further embodiment of the invention, a computer program product for foreign name matching is provided including a non-transitory storage medium readable by a processing circuit and storing instructions for execution by the processing circuit for performing a method. The computer program product includes receiving a first entity name from a first database, wherein the first database includes a plurality of entity names in a first language and receiving a second database, wherein the second database includes a plurality of entity names in a second language, wherein the first language is different from the second language. The computer program product further includes performing an Internet search query based on the first entity name, wherein a language setting of the Internet search query is configured to the second language, and identifying a list of candidate names based on a set of results from the Internet search query. The computer program product includes filtering the list of candidate names to obtain a resulting candidate name, and determining whether the resulting candidate name matches one of the plurality of entity names in the second database. Based on the determining whether the resulting candidate name matches one of the plurality of entity names in the second database, the computer program product includes creating an association between the first entity name in the first database and a matching entity name in the second database.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

In accordance with exemplary embodiments of the disclosure, methods, systems, and computer program products for foreign organization name matching are provided. Exemplary embodiments include leveraging online search tools to determine matching entries between foreign databases. In general, online search engines are helpful for searching data in different languages and have the capability to correct typographical errors and compensate for incomplete search queries. In exemplary embodiments, a company name associated with a first language is searched using a first Internet search tool where the search tool is configured in a second language. For example, "Bank of China" is searched in Chinese. Exemplary embodiments include performing another Internet search based on the results of the first search where the second search is configured in the second language. For example, taking the results of searching "Bank of China" from a first search and using those results, a second search is performed where the second search is performed in Chinese. Embodiments include filtering the search results. Other embodiments include comparing the results of the two searches to determine the most relevant match. Exemplary embodiments also include calculating a confidence level and confidence threshold to determine the most relevant matches. Although this disclosure generally refers to this specific embodiment, it will be apparent to those of ordinary skill in the art that the methods taught herein can be used for any entry matching technique between foreign databases.

Figure 1:
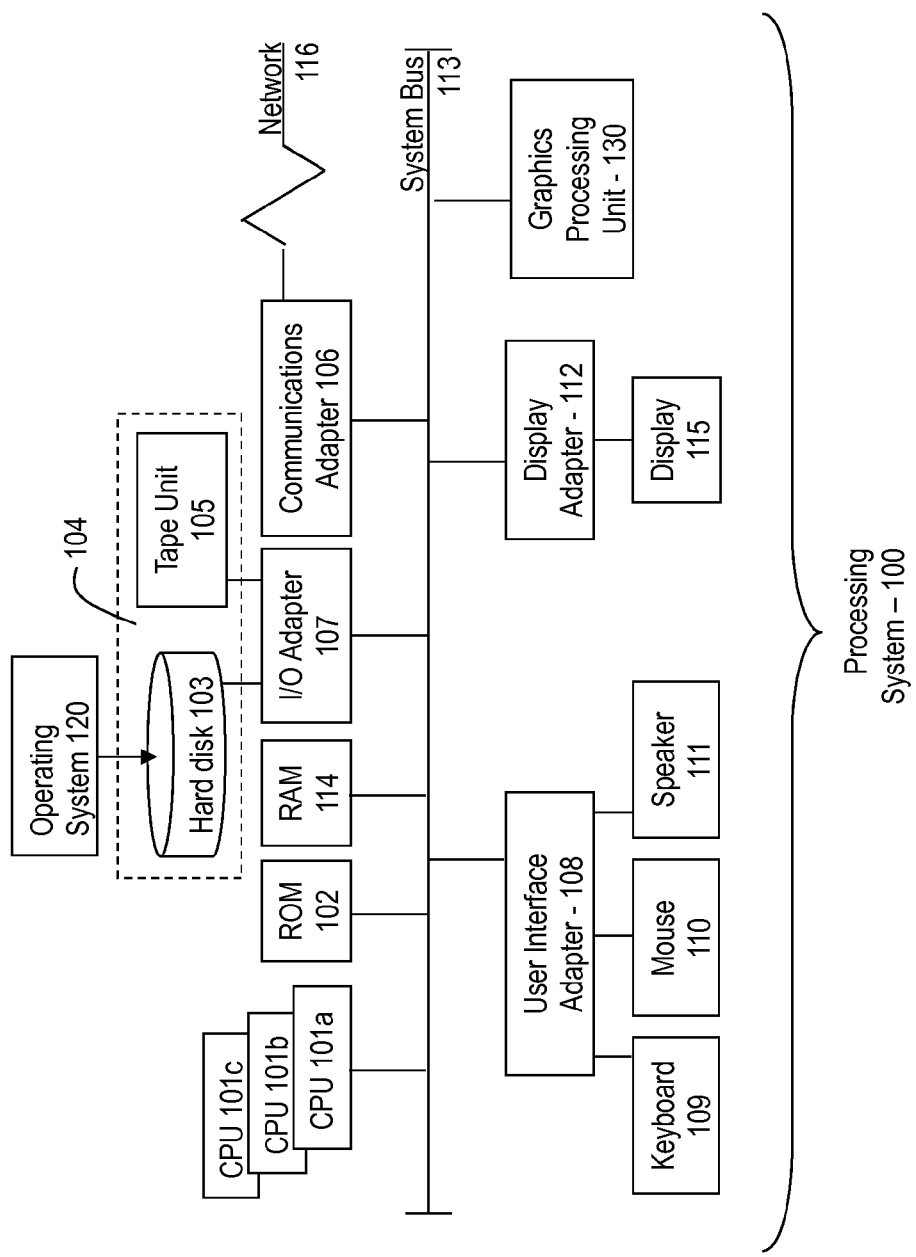
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

Figure 2:
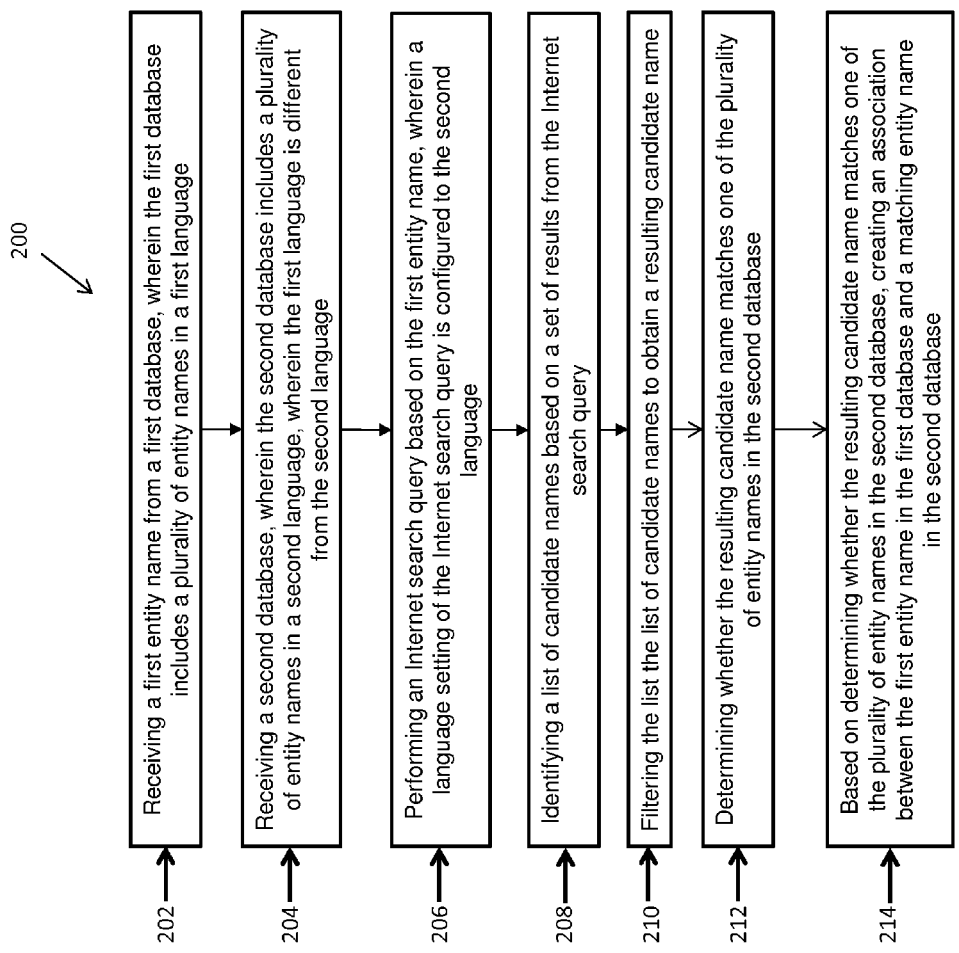
FIG. 2 is a flow diagram illustrating a method for foreign organization name matching in accordance with an exemplary embodiment.

Referring now to FIG. 2, a flow diagram of a method 200 for foreign organization name matching in accordance with an exemplary embodiment is shown. As shown at block 202, the method 200 includes receiving a first entity name from a first database, wherein the first database includes a plurality of entity names in a first language. As an example, the received entity name is "Bank of China" or "BOC." Next, as shown at block 204, the method includes receiving a second database, wherein the second database includes a plurality of entity names in a second language, wherein the first language is different from the second language. For example, the second database can be configured to store data in the second language which is Chinese, while the first language is configured to English.

As shown in block 206, the method of 200 includes performing an Internet search query based on the first entity name, wherein the language setting of the Internet search query is configured to the second language. For example, "Bank of China" or "BOC" is searched in an online search engine, such as Google, Bing, or Yahoo!, where the Internet search language setting is set to Chinese. Next, as shown in block 208, the method 200 includes identifying a list of candidate names based on a set of results from the Internet search query. In order to identify the list of candidate names, a subset of the search results from the Internet search query may be determined. For example, the top 10 search results may comprise the list of candidate names where any number of candidate names can be configured to be the top candidates.

As shown in block 210, the method 200 further includes filtering the list of candidate names to obtain a resulting candidate name. The result of filtering the list is not limited to a single resulting candidate name, but could result in a list of a plurality of resulting candidate names. Various filtering techniques can be used to determine the most relevant results from the search and to remove unwanted search hits. Filtering can be based on co-occurrence frequency, transliteration, translation, or other known filtering techniques. Co-occurrence frequency filtering occurs when a term appearing in the search results is compared to the other terms of the search result. The terms that appear in the highest frequency are deemed most relevant. In contrast when terms appear less in frequency they are deemed less relevant and can be removed from the list of results. Transliteration is technique where each of the characters of a term are represented in a different alphabet. As an example transliteration may be based on Pinyin, abbreviations, or Wade-Giles spelling. Translation is a technique where words or text from one language are represented in another language. Additionally, translations may be based on by pronunciation or it may be based on the literal meaning of the terms. Filtering is not limited to these aforementioned techniques, but other known filtering techniques may also be applied. Any of these techniques or combination of techniques may be used to filter the list of candidate names.

Next, as shown in block 212, the method 200 includes determining whether the resulting candidate name matches one of the plurality of entity names in the second database. As shown in block 214 of method 200, when a resulting candidate name is matched to one of the plurality of entity names in the second database, an association is created between the first entity name in the first database and the matching entity name in the second database.

Figure 3:
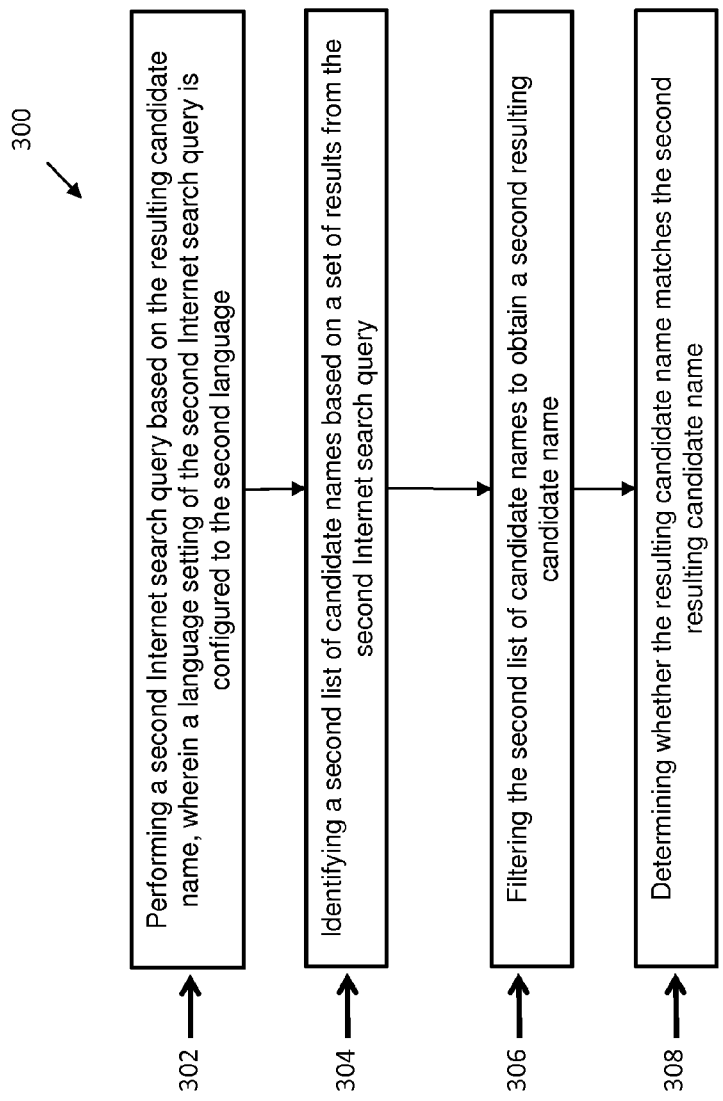
FIG. 3 is a flow diagram illustrating another method of foreign organization name matching in accordance with an exemplary embodiment.

Referring now to FIG. 3, a flow diagram of a method 300 for foreign organization name matching in accordance with an exemplary embodiment is shown. In an exemplary embodiment when the method of FIG. 2 does not lead to a matching result, the method 300 can be executed. The flow diagram of method 300 is also referred to herein as a bi-language matching procedure. As shown in block 302, the method of 300 includes performing a second Internet search query based on the resulting candidate name, wherein a language setting of the second Internet search query is configured to the second language. For example, 中行 (which translates to "BOC" represents "Bank of China") as a resulting candidate name is searched in an Internet search engine, where the language setting of the Internet search engine is set to Chinese.

As shown in block 304, the method of 300 includes identifying a second list of candidate names based on a set of results from the second Internet search query. Next, as shown at block 306, the method 300 further includes filtering the second list of candidate names to obtain a second resulting candidate name. As shown in block 308, the method of 300 includes determining whether the resulting candidate name matches the second resulting candidate name. If a match results, then an association is created between the resulting candidate name and the second resulting candidate name.

However, if no match results between the resulting candidate name and the second resulting candidate name, a confidence level is calculated to determine the correspondence of the resulting candidate name to the second resulting candidate name. The confidence level indicates a probable association of the resulting candidate name and the second resulting candidate name between the first language and the second language. The association with the highest confidence level is selected as the most suitable match.

In an exemplary embodiment, the resulting candidate name and the second resulting candidate name are lists including a plurality of resulting candidate names. Additionally, these lists can be compared to each other to determine the matches between the results returned from the first Internet search query and results returned from the second Internet search query. Confidence levels can be calculated to determine the associations between the lists.

In an exemplary embodiment, a confidence level threshold is used to identify a potentially related match. Matches that fail to meet the confidence level threshold can be removed from further consideration. The confidence level threshold can be learned from a standard training set.

In an exemplary embodiment, the initial Internet search query can include searching the first entity name in the first language and one or more entity types in the second language. An entity type describes a type of business which includes but is not limited to terms indicating a company, LLC, LLP, Inc. and others, to optimize the search results. For example, an Internet search query would include both "Bank of China" (BOC) and "公司" in a single search string. 公司 translates to "company" in English. Including the entity type in the search query will inform the search engine on the preferred scope of search, which will lead to the Internet search tool providing higher quality results.

In an exemplary embodiment, a bi-matching process is executed when given the candidate names resulting from the first Internet search query where the language setting is set to a second language, the candidate names are searched reversely, meaning the candidate names are searched in the first language. If the search results indicate the originally searched entity name, the confidence level is very high because the reverse search found a match. For example, searching "Bank of China" or "BOC" in an initial search query, where the language setting of the Internet search query is set to a second language (Chinese), results in the candidate names including 中国银行 and 工商银行. In bi-matching these candidate names (中国银行 and 工商银行) are then searched in the first language (English). Reversely searching 中国银行 results in many relevant "Bank of China" and "BOC" search hits while searching 工商银行 results in very few "Bank of China" or "BOC" related search hits. Therefore we know that 中国银行 is the most relevant candidate name. The candidate names that are not relevant may be removed from the list based on this technique. If the reverse search results in an entity name matching the originally searched entity name, then the confidence level will be high.

In an exemplary embodiment, bi-language searching includes a first search being performed in a second language and a second search being performed in the same second language. The results of the two searches are then cross-checked with one another to determine the likelihood of any existing matches. This cross-check is referred to as a final matching procedure. After the first Internet search query which is described above is performed, a second Internet search query is performed. For example, "中行," which stands for "BOC" (Bank of China), is searched in Chinese which is the second language. If the results contain several search results containing "中国银行" then it is likely that these refer to the same entity. If so, an association is created among these matching entity names. In sum, the final matching process performs a second Internet Search in the second language where the results are compared to the results of the initial Internet search query.

When comparing the two lists, a confidence level and a confidence level threshold can be calculated. They are then used to determine the relationship between the candidate names in the two lists, and the associations having the highest confidence level are taken to be related.

In an exemplary embodiment, after the list of candidates names are identified from a first Internet search query, each of the candidate names are segmented and analyzed by existing word segmentation and entity detection methods. These results are then screened and filtered by various techniques. The remaining candidate names are then reversely searched, in the aforementioned bi-matching process. The object recognition process allows for a granular analysis of the terms in the candidate names in addition to considering the combination of terms in a candidate name as a whole. Object recognition enhances the quality of the search results.

Figure 4:
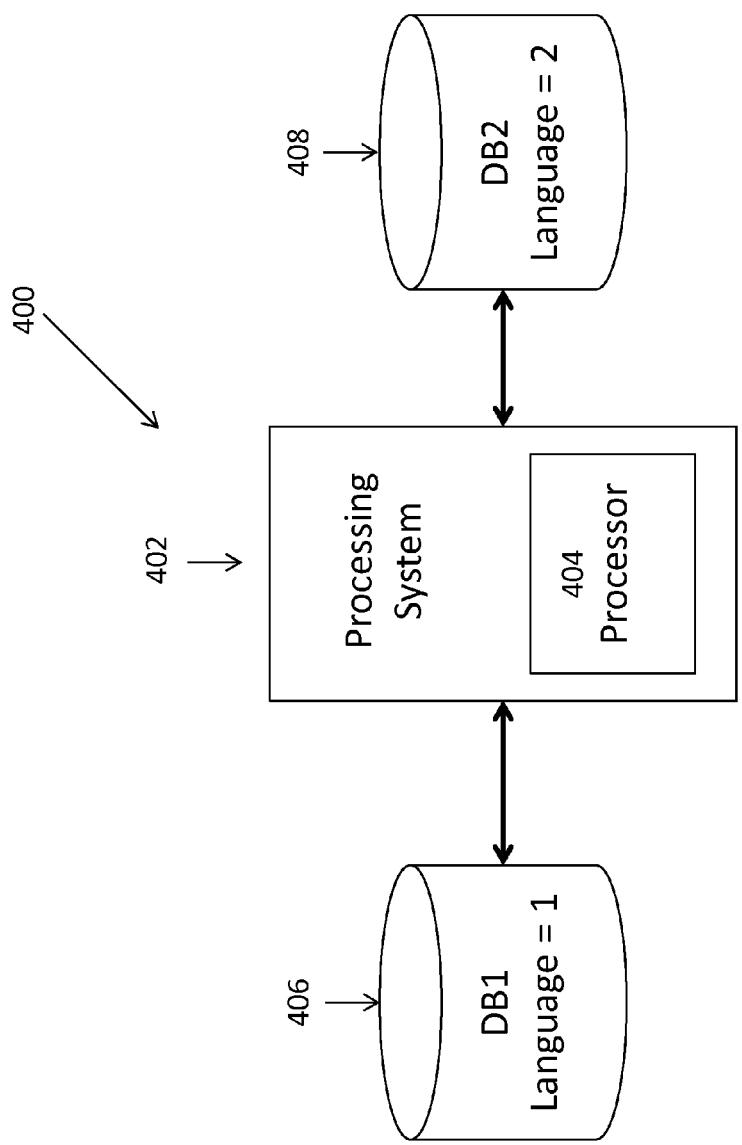
FIG. 4 is a block diagram of a system for implementing the method of foreign organization name matching in accordance with an exemplary embodiment.

Referring now to FIG. 4, a system 400 of an exemplary embodiment in accordance with the invention is shown. Processing system 402, may be the processing system shown as such in FIG. 1, includes a processor 404. The processing system 402 is configured to communicate with database 406, which stores data in a first language, and is also configured to communicate with database 408, which stores data in a second language. In an exemplary embodiment, the processing system 402 is configured to use the method discussed herein to identify common entities across the first and second databases, and to create associations between the common entities.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for foreign organization name matching comprising a processor, the processor being configured to:
receive a first entity name from a first database, wherein the first database includes a plurality of entity names in a first language;
receive a second database, wherein the second database includes a plurality of entity names in a second language, wherein the first language is different from the second language;
perform an Internet search query based on the first entity name, wherein a language setting of the Internet search query is configured to the second language, wherein performing the Internet search query includes simultaneously searching both the first entity name in the first language and one or more entity types in the second language in a single search string, wherein the one or more entity types is associated with a business type, wherein the business type is one of a company type, a limited liability company (LLC), a limited liability partnership (LLP), and an incorporation;
identify a list of candidate names based on a set of results from the Internet search query;
filter the list of candidate names to obtain a resulting candidate name;
wherein the filtering removes one or more candidate names from the list based on a co-occurrence frequency check among the candidate names;
determine whether the resulting candidate name matches one of the plurality of entity names in the second database; and
based on the determination of whether the resulting candidate name matches one of the plurality of entity names in the second database, create an association between the first entity name in the first database and a matching entity name in the second database.

2. The system of claim 1, wherein the filtering removes one or more candidate names from the list based on a translation of one or more of the first entity names and the candidate names, wherein the translation is between the first language and the second language.

3. The system of claim 1, wherein filtering removes one or more candidate names form the list based on a transliteration of the first entity name.

4. The system of claim 1, based on a determination that the resulting candidate name does not match one of the plurality of entity names of the second database, the processor further configured to:
perform a second Internet search query based on the resulting candidate name, wherein a language setting of the second Internet search query is configured to the second language;
identify a second list of candidate names based on a set of results from the second Internet search query; and
filter the second list of candidate names to obtain a second resulting candidate name; and
determine whether the resulting candidate name matches the second resulting candidate name.

5. The system of claim 4, wherein the processor is further configured to:
determine there is no match between the resulting candidate name and the second resulting candidate name, calculate a confidence level to determine the association between the resulting candidate name and the second resulting candidate name;
wherein the confidence level reflects a correspondence chance between the first language and the second language.

6. The system of claim 5, the processor is further configured to:
utilize a confidence level threshold to identify a potential related result, wherein the confidence level threshold is learned from a standard training set.

7. The system of claim 1,
wherein performing the Internet search query includes searching the first entity name in the first language and one or more entity types in the second language.

8. A computer program product for foreign name matching including a non-transitory storage medium readable by a processing circuit and storing instructions for execution by the processing circuit for performing a method, comprising:
receiving a first entity name from a first database, wherein the first database includes a plurality of entity names in a first language;
receiving a second database, wherein the second database includes a plurality of entity names in a second language, wherein the first language is different from the second language;
performing an Internet search query based on the first entity name, wherein a language setting of the Internet search query is configured to the second language, wherein performing the Internet search query includes simultaneously searching both the first entity name in the first language and one or more entity types in the second language in a single search string, wherein the one or more entity types is associated with a business type, wherein the business type is one of a company type, a limited liability company (LLC), a limited liability partnership (LLP), and an incorporation;
identifying a list of candidate names based on a set of results from the Internet search query;
wherein the filtering removes one or more candidate names from the list based on a co-occurrence frequency check among the candidate names;
filtering the list of candidate names to obtain a resulting candidate name;
determining whether the resulting candidate name matches one of the plurality of entity names in the second database; and
based on the determining whether the resulting candidate name matches one of the plurality of entity names in the second database, creating an association between the first entity name in the first database and a matching entity name in the second database.

9. The computer program product of claim 8, based on a determination that the resulting candidate name does not match one of the plurality of entity names of the second database, the method further comprises:
performing a second Internet search query based on the resulting candidate name, wherein a language setting of the second Internet search query is configured to the second language;
identifying a second list of candidate names based on a set of results from the second Internet search query; and
filtering the second list of candidate names to obtain a second resulting candidate name; and
determining whether the resulting candidate name matches the second resulting candidate name.

10. The computer program product of claim 9,
determining there is no match between the resulting candidate name and the second resulting candidate name, calculating a confidence level to determine the association between the resulting candidate name and the second resulting candidate name;

wherein the confidence level reflects a correspondence chance between the first language and the second language; and utilizing a confidence level threshold to identify a potential related result, wherein the confidence level threshold is learned from a standard training set.

11. The computer program product of claim 8, wherein performing the Internet search query includes searching the first entity name in the first language and one or more entity types in the second language.

* * * * *